United States Patent [19]
Yoshida

[11] 4,319,121
[45] Mar. 9, 1982

[54] METHOD OF PRODUCING CLAD STEEL MATERIALS

[75] Inventor: Toshio Yoshida, Kobe, Japan

[73] Assignee: Kawasaki Jukogyo Kabushiki Kaisha, Kobe, Japan

[21] Appl. No.: 143,869

[22] Filed: Apr. 25, 1980

[30] Foreign Application Priority Data

Jul. 11, 1979 [JP] Japan .................. 54-86946

[51] Int. Cl.³ .............................................. B23K 15/00
[52] U.S. Cl. ...................... 219/121 ED; 219/121 EM
[58] Field of Search ................. 219/121 EC, 121 ED, 219/121 EB, 121 EM, 121 LC, 121 LD, 121 L, 121 LM; 228/153, 154, 158, 126

[56] References Cited

U.S. PATENT DOCUMENTS

| | | | |
|---|---|---|---|
| 2,371,348 | 3/1945 | Murray | 228/242 X |
| 3,054,176 | 9/1962 | Beneke | 228/158 X |
| 3,481,024 | 12/1969 | Bunn | 228/242 X |
| 3,858,428 | 1/1975 | Thompson | 228/158 X |
| 3,914,574 | 10/1975 | Hill et al. | 219/121 ED |
| 3,949,186 | 4/1976 | Nakayama et al. | 219/121 PK X |
| 4,145,094 | 3/1979 | Vezirian | 219/121 ED X |

FOREIGN PATENT DOCUMENTS

| | | | |
|---|---|---|---|
| 55-01958 | 1/1980 | Japan | 219/121 ED |
| 55-10395 | 1/1980 | Japan | 219/121 ED |

*Primary Examiner*—C. L. Albritton
*Attorney, Agent, or Firm*—Haseltine and Lake

[57] ABSTRACT

A steel blank is placed in intimate contact along a joint interface with a blank of another metal, and the two blanks are welded along and throughout the interface by a superhigh-output electron beam thereby to obtain a metallurgical welded joint and to form an integral blank which is rolled or otherwise formed into a clad steel article.

8 Claims, 20 Drawing Figures

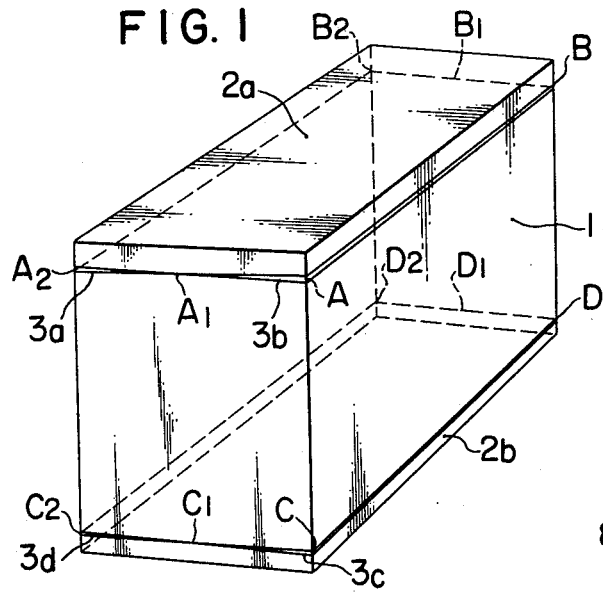
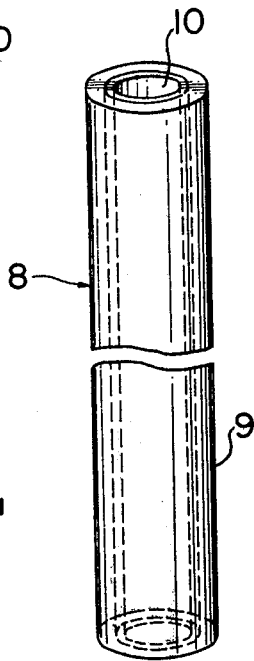
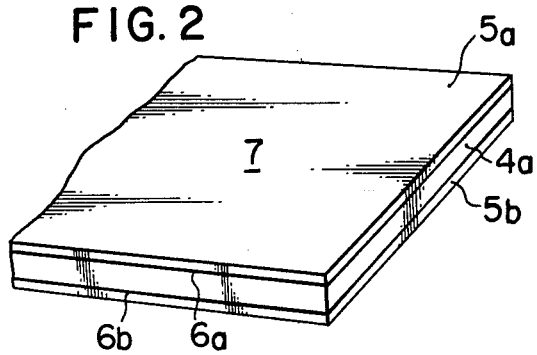
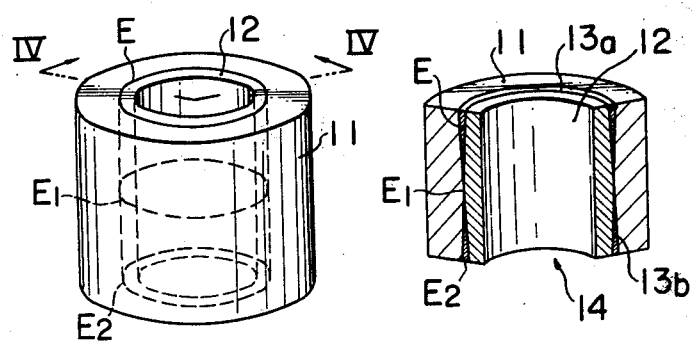

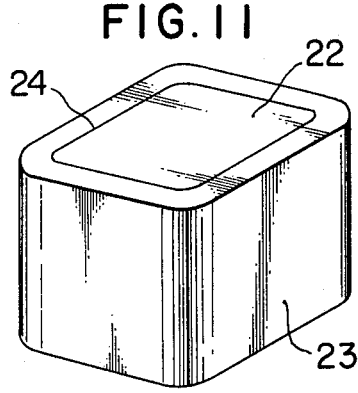
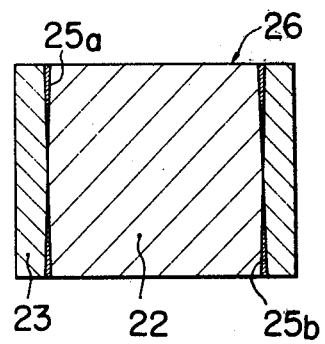
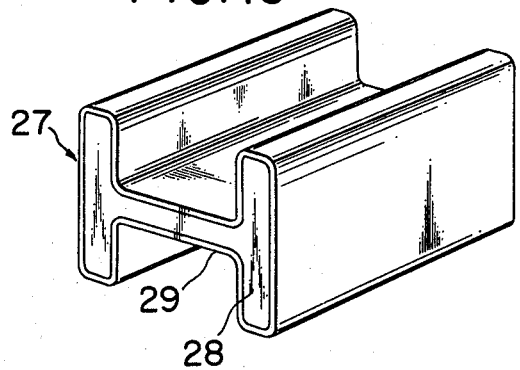
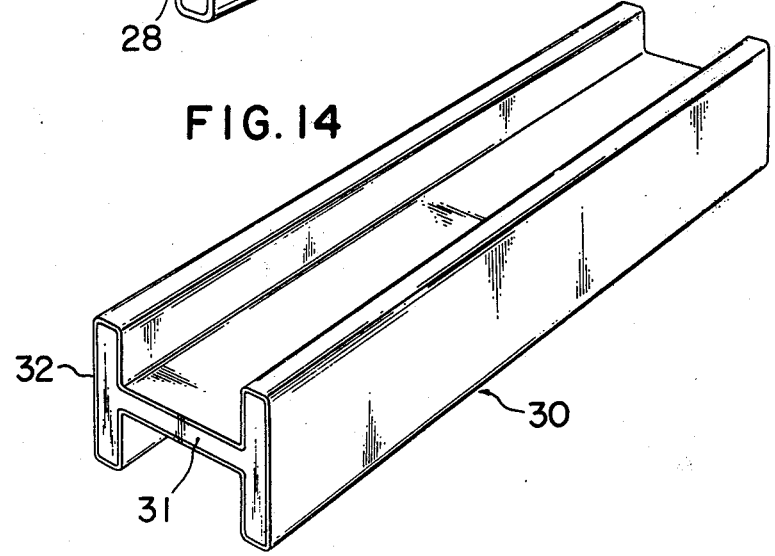

METHOD OF PRODUCING CLAD STEEL MATERIALS

BACKGROUND OF THE INVENTION

This invention relates to techniques for producing a variety of clad steels by joining together in laminated state a plurality of metal materials by electron-beam welding to prepare a welded blank and then rolling or otherwise stretching the welded blank into the desired clad steel materials.

More particularly, the invention relates to a method of producing clad steel materials as products in which method a superhigh-output electron beam is directed deeply into and along the interface between intimately contacting blanks of metals to be welded thereby to weld together all parts of the blanks thus in mutual contact at the interface therebetween.

Steel materials such as steel plates, steel pipes, steel bars, and steel shapes are being used widely and in great quantities in various industrial fields for constructing a broad range of structures such as bridges, buildings, piping and vessels, chemical plants, oil-field equipment, pipelines for fluids, and heat exchangers. These materials in most cases are required to have not only mechanical strength but also durability over long periods of use, that is, properties such as heat resistance, corrosion resistance, and wear resistance.

While the material conditions of these steel materials with respect to the material properties, thickness, etc. are determined from the strength aspect as a first consideration, the conditions for the aspect of the above mentioned durability do not coincide with those for strength. That is, a steel of high tensile strength does not necessarily have excellent corrosion resistance. Accordingly, it has been the practice to resort to measures such as cladding, simple lining, and coating with appropriate metal materials, single non-metallic materials, mixtures thereof, and the like for protecting steel materials.

Particularly in recent years there is a trend toward the building of larger and more complicated structures. This trend has given rise to great increases in not only construction costs but also in running cost relating to operation and maintenance for such measures as corrosion proofing, whereby there is an ever increasing need for steel materials having ample corrosion resistance together with strength.

For example, cases wherein steels of high tensile strength are used as reinforcing materials are increasing. However, high-tensile-strength steels, contrary to their excellent strength characteristic, are not necessarily fully satisfactory on the point of corrosion resistance. Accordingly, as a countermeasure, it is possible to use a stainless steel which has excellent corrosion resistance. A stainless steel, however, is somewhat inferior in strength, whereby it has the demerit of giving rise to thick and heavy construction and high costs.

Accordingly, a technique wherein, with the aim of utilizing the advantages of the two steels thereby to make up for their deficiencies, a high-tensile-strength steel is used as the base metal, and a stainless steel is caused to adhere intimately to the base metal thereby to impart their respective strength and corrosion resistance characteristics to the combination has been proposed. In this case, it is highly desirable on the points of economy and strength of materials that the expensive bonded stainless steel be thin and that the strength of the bond between the metals be high.

As a technique for bonding intimately to one metal material a metal of a different kind, the cladding method is commonly used. For carrying out this cladding, there are, for example, the explosive-cladding method, the weld-overlaying method, and the hot-rolling method.

The explosive-cladding method utilizes the application of instantaneous high pressure accompanying the explosion of an explosive. This method requires expensive equipment and, moreover, safety measures and means, whereby it is not easily practiced.

The weld-overlaying method comprises welding and adding a molten padding of a stainless-steel filler material on the surface of a base material of carbon steel. This method is accompanied by the problems such as welding strain imparted by the welding heat during the welding, the long time required for the welding work, low work efficiency, and limitation of the selectable filler materials of good weldability.

The method of producing electric-resistance welded steel pipes from clad steel strip formed into tubes, which is similar to this, also requires much labor and has other drawbacks such as precipitation of carbides due to heat of welding and the necessity of homogenizing the welded structure by head treatment after welding.

The hot-rolling method is a historically old technique in which a metal material is placed intimately against a metal material of another kind after their contact faces have been cleansed, and then the two materials are hot rolled, in which process step, fresh surfaces are generated on the contact faces and the two materials are roll welded while they are still at a high temperature. Accordingly, the provision beforehand of clean contact faces is an indispensable condition. Therefore, in order to satisfy this condition, the presence of residual air in the contact faces and the formation of oxide films thereon must be absolutely avoided. Furthermore, this method requires a large reduction ratio and a high rolling temperature, for which various measures have heretofore been resorted to, but the means have been disadvantageously complicated and inefficient in many instances.

With the aim of overcoming these difficulties, hot-rolling methods wherein joining of the metal materials by electron-beam welding, as disclosed in Japanese Patent Publication No. 19819/1976, are being proposed. In such a hot-rolling method, troublesome work in the joining process such as removal of residual air on the contact face with a vacuum pump, deoxidation, and pretreatment and filling of a denitrification agent are eliminated, and efficient production of clad steel is made possible. However, this method is accompanied by certain difficulties as will be described hereinafter in conjunction with illustrations.

SUMMARY OF THE INVENTION

It is an object of this invention to provide a method for producing clad steel materials without the accompaniment of the above described difficulties encountered in the production of clad steel products by methods of the prior art.

According to this invention, briefly summarized, there is provided a method for producing clad steel materials by placing against a steel material a material of a different metal in laminated state with mutual contact along a joint interface, carrying out electron-beam welding at the joint interface thereby to join the metal materials by a sealing weld, and rolling or otherwise extending the metal materials thus joined, the method being characterized in that the welding is carried out along and throughout the joint interface by means of a superhigh-output electron beam thereby to obtain a metallurgical welded joint along the entire interface.

By the use of a superhigh-output electron beam in the practice of this invention as summarized above, the welding of base metal and clat metal can be accomplished to ample depth along the interface therebetween to obtain an integral blank structure. This structure can then be stretched by any suitable process such as hot rolling, cold rolling, or forging and rolling to produce a clad steel plate, a clad steel pipe, and clad steel shape, or another clad steel structure.

The nature, utility, and further features of this invention will be apparent from the following detailed description with respect to preferred embodiments of the invention when read in conjunction with the accompanying drawings briefly described below.

BRIEF DESCRIPTION OF THE DRAWINGS

In the drawings:

FIG. 1 is a perspective view indicating the manner in which clad metal plates are welded by a superhigh-output electron beam to opposite sides of a base steel ingot to prepare a welded blank according to this invention;

FIG. 2 is a fragmentary perspective view showing a clad steel plate produced according to the invention by rolling the blank shown in FIG. 1;

FIG. 3 is a perspective view of an outer steel tubular blank and an inner lining metal blank for preparing a tubular blank;

FIG. 4 is a perspective view showing a fragment of the blanks shown in FIG. 3 cut off along planes indicated by line IV—IV therein and viewed in the arrow direction after these blanks have been welded together by a superhigh-output electron beam to form a welded tubular blank according to the invention;

FIG. 5 is a foreshortened perspective view of a lined steel pipe formed from the welded tubular blank indicated in FIG. 4;

FIG. 11 is a perspective view of blanks for use in another embodiment of the invention;

FIG. 12 is a longitudinal section of the blanks shown in FIG. 11 after they have been welded together by a superhigh-output electron beam according to the invention;

FIG. 13 is a perspective view of a clad steel H-beam blank formed from the blank shown in FIG. 12;

FIG. 14 is a perspective view of a clad steel H-shape formed by rolling the blank shown in FIG. 13;

DETAILED DESCRIPTION OF THE INVENTION

As conductive to a full understanding of this invention, the previously proposed joining of different metals by electron-beam welding and rolling, mentioned briefly hereinbefore, will first be considered.

Figure 15A:
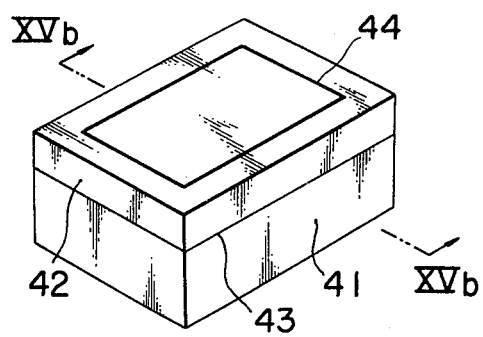
FIGS. 15a and 15b are respectively a perspective view and a section taken along the plane indicated by line XVb—XVb in FIG. 15a indicating the manner in which a clad metal is welded by an electron beam to a base steel blank according to a method in the prior art.
Figure 15B:
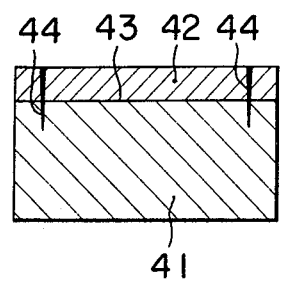

Referring first to FIGS. 15a and 15b, to a base steel material 41, a different metal material 42 is to be joined at an interface 43. The respective contact faces of the materials 41 and 42 to be joined at the interface 43 are made as clean as possible and placed in intimate contact with each other, and the materials 41 and 42 in this state are placed in a suitable vacuum apparatus. Then, perpendicularly to and from the outer surface (i.e., upper surface as viewed in FIGS. 15a and 15b), an electron beam is projected into the combined materials to intersect the interface 43 and is caused to trace a path in the vicinity of, and around the outer periphery of metal material 42 thereby to form an electron-beam welded bead 44. Thus, the two metal materials 41 and 42 are secured together by melt connection, and the vacuum at the interface is maintained. The resulting structure is thereafter hot rolled.

Figure 16A:
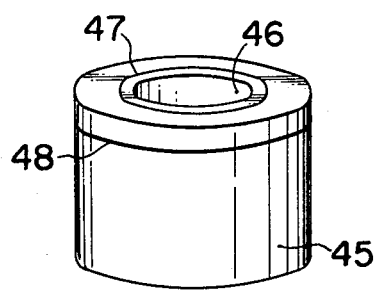
FIGS. 16a and 16b are respectively views corresponding to FIGS. 15a and 15b indicating the prior art method applied to prepare a welded blank for producing a clad steel pipe.
Figure 16B:
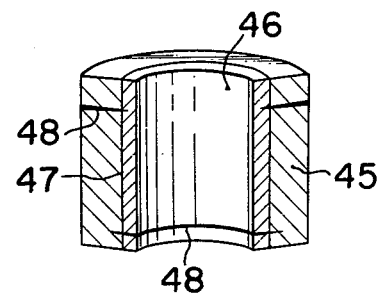

FIGS. 15a and 15b illustrate the joining of two metal materials of flat plate form, while FIGS. 16a and 16b show the joining of two tubular materials 45 and 46 to form a double-wall tube having an interface 47 and an electron-beam welded bead 48.

Figure 17:
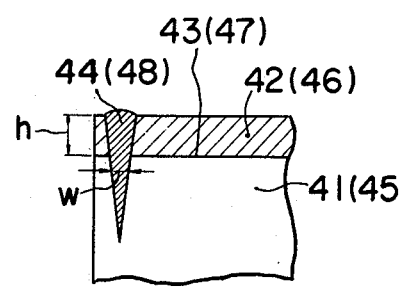
FIG. 17 is a fragmentary sectional view for a description of joining blank metal materials by electron-beam welding in a method in the prior art.

The two different metal materials 41 and 42 (45 and 46) have mutually different coefficients of thermal expansion. For this reason, there is a possibility, in the heating and rolling step after the joining by welding, of the occurrence of thermal stress and rolling slippage, whereby fractures are produced in the metal of the bead 44 (48) at the weld intersection part, and the vacuum positively obtained in the welding step is broken. For this reason, it is considered necessary to make the thickness W of the weld metal 44 (48) at least one half ($\frac{1}{2}$) of the thickness h of the welded different metal 42 (46) as shown in FIG. 17.

However, the thickness of a bead 44 (48) formed by the conventional electron-beam welding process used until now has ordinarily been of the order of 5 to 6 mm. Therefore, when the thickness of the above mentioned different metal 42 (46) exceeds 30 to 50 mm, the use of this method becomes impossible.

Figure 18:
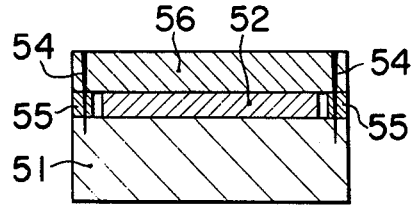
FIG. 18 is a sectional view indicating another mode of preparing by electron-beam welding a welded blank for producing a clad steel material by a method in the prior art.

As a measure for solving this problem, Japanese Patent Laid Open Publication No. 13459/1977 discloses a method wherein a different metal 52 is interposed between a metal material 56 and the base metal material 51, and a separated material 55 is fitted around the outer periphery of the different metal 52 thereby to preserve the periphery thereof in sealed state as shown in FIG. 18. The electron-beam weld 54 in this case is made through the material 56, the separated material 55, and the base metal material 51. This method, however, is accompanied by a number of difficulties such as the difficulty of maintaining precision because of the complicated assembly process and is not readily practical.

The above described difficulties and deficiencies of the prior art have been overcome by this invention which will now be described with respect to preferred embodiments thereof with reference to FIGS. 1 through 14.

In the first embodiment of this invention as illustrated in FIGS. 1 and 2, a carbon steel ingot 1 of the shape of a rectangular parallelopiped is used as one of the metal materials. The upper and lower surfaces (as viewed in FIG. 1) A $A_1A_2B_2B_1B$ and C $C_1C_2D_2D_1D$ are made contact surfaces to which stainless-steel plates 2a and 2b are to be secured. The contact surfaces of these stainless-steel plates 2a and 2b are finished by suitable machining, and the three structures are stacked in the laminated arrangement shown and placed in the vacuum chamber of a suitable superhigh-output electron-beam apparatus (not shown).

Then a superhigh-output electron beam is first projected along the outer peripheral edge of the interface between the plate 2a and the ingot 1 along opposite longitudinal sides, the electron beam being projected in opposite directions parallel to the plane of the interface. That is, the electron beam is projected from point A toward point $A_1$ so that it fully reaches the point $A_1$, and then it is moved at a suitable speed from the end A to the end B. As a result, the interface $AA_1B_1B$ is fully joined by metallurgical welding throughout its expanse as at 3b. Thereafter, the remaining portion $A_2A_1B_1B_2$ of the interface is electron-beam welded in a similar manner as at 3a. In this manner the entire joint interface $AA_1A_2B_2B_1A$ between the carbon-steel ingot 1 and the stainless-steel plate 2a is fully joined by metallurgical welding.

As a modification, instead of projecting the electron beam against one side at a time as described above, two superhigh-output electron-beam apparatuses may be operated respectively on the AB side and the $A_2B_2$ side to carry out simultaneously the welding of both sides.

Upon completion of the joining by welding of the upper stainless-steel plate 2a to the carbon-steel ingot 1 in this manner, the lower stainless-steel plate 2b is similarly welded and joined to the ingot 1 at the interface parts $CC_1D_1D$ and $C_2C_1D_1D_2$. As a result, the three metal materials 1, 2a, and 2b ar metallurgically joined as an integral structure.

The integral structure thus obtained is taken out of the superhigh-output electron-beam apparatus and transferred to a suitable hot-rolling apparatus. Then, by a known rolling or press-stretching process, the integral structure is rendered into a stainless-steel clad steel plate 7 as illustrated in FIG. 2.

In this stainless-steel clad steel plate 7, the electron-beam beads 6a and 6b remain unbroken and prevent the infiltration of air into the interfaces between the three metal layers, thereby preserving a strong metallurgical bond among the laminated metal materials.

One example of practice based on the above described embodiment of this invention is described below.

The materials used were a carbon steel ingot of a 600-mm length, a 1,000-mm width, and a 800-mm thickness and upper and lower stainless-steel plates of a 600-mm length, a 1,000-mm width, and thicknesses of 40 mm and 20 mm, respectively.

A superhigh-output electron beam was applied with an output of 100 KW, a beam penetration depth of 320 mm, and a welding speed of 100 mm/min. and amply reached 300 mm, which was one half of the length of 600 mm of the weld interface.

The integral laminated structure was hot rolled in a roll mill at a rolling temperature of 800° C. to produce a reduction ratio of 40.

As a result, a stainless-steel clad plate of a carbon-steel core layer of a thickness of 20 mm, an upper stainless-steel layer of a thickness of 1 mm, and a lower stainless-steel layer of a thickness of 0.5 mm, that is, a total thickness of 21.5 mm, was obtained.

The mode of producing this stainless-steel clad steel plate is not limited to the above described embodiment of the invention, various other modes of practice being possible. For example, cold rolling can be used without any damage whatsoever to the metallurgical bond between the layers.

In another embodiment of this invention as illustrated in FIGS. 3, 4, and 5, a double-wall pipe 8 representing a multiple-wall pipe is fabricated from an outer pipe 9 and an inner pipe 10. The outer pipe 9 is a carbon-steel pipe of high tensile strength to serve as a metal base material for preserving the strength of the finished double-wall pipe. The inner pipe 10 is a different metal material of stainless steel which is corrosion resistant.

First, as shown in FIG. 3, surfaces $EE_1E_2$ to be welded of a carbon-steel pipe blank 11 and a stainless-steel pipe blank 12 to be fitted into the hollow interior of the pipe blank 11 are machine finished to a degree such that the two pipes can be welded by a superhigh-output electron beam similarly as in the preceding embodiment of the invention. Then, by the use of suitable means, the inner pipe blank 12 is fitted into the outer pipe blank 11, and the combined structure is placed in the vacuum chamber of a superhigh-output electron-beam welding apparatus. Then, in the axial direction and, moreover, along the above mentioned joint surfaces $EE_1E_2$, the electron beam is projected so that it penetrates beyond the middle part $E_1$ from one end or both ends and is moved laterally at a specific welding speed around the cylindrical joint surface or cylindrical interface between the two pipe blanks 11 and 12 through one full circle. As a result, the two pipe blanks 11 and 12 are fully joined over the entire joint surfaces $EE_1E_2$ by weld metal 13a and 13b.

In the above described welding process, the beam penetration of the superhigh-output electron beam, of course, amply reaches one half of the depth in the axial direction of the joint surface $EE_1E_2$.

The metal pipe blanks welded in this manner into an integral structure is removed from the electron-beam apparatus and, as a double-wall pipe blank 14 is hot rolled by a known method thereby to produce a double-wall pipe 8 of the stainless-steel clad steel material as shown in FIG. 5.

One example of practice based on the above described embodiment of the invention is described below.

The materials used were a carbon-steel pipe blank of a joint surface diameter of 180 mm, a wall thickness of 120 mm, and length of 600 mm and a stainless-steel pipe blank of an inner diameter of 100 mm, a wall thickness of 40 mm, and a length of 600 mm.

An electron beam capable of amply penetrating to a depth of at least 300 mm, which is one half of the length of the above pipe blanks was projected with an output of 100 KW to melt the blanks to a depth of 320 mm as it was moved at a welding speed of 100 mm/min.

The integrally welded structure thus obtained was press rolled to a reduction ratio of 20 at a rolling temperature of 800° C.

As a result, a clad steel double-wall pipe of an inner diameter of 100 mm, an inner pipe wall thickness of 2 mm, and outer pipe wall thickness of 6 mm, and a length of 12,000 mm was obtained.

Alternatively in the above described process, of course, the pipe blank after welding can be cold rolled.

Figure 6:
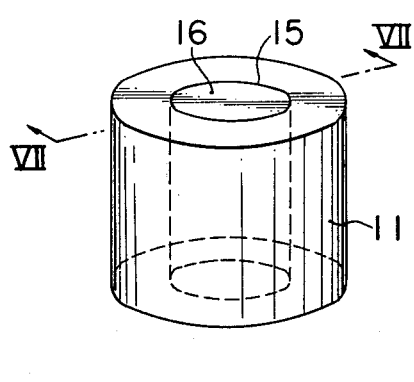
FIG. 6 is a perspective view of an outer steel tubular blank and an inner lining metal blank for preparing a welded blank.
Figure 7:
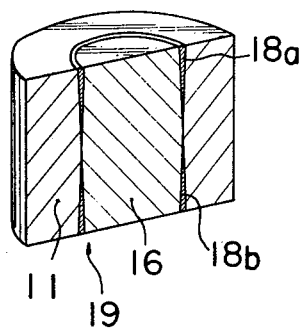
FIG. 7 is a perspective view showing a fragment of the blanks shown in FIG. 6 cut off along a plane indicated by line VII—VII therein and viewed in the arrow direction after these blanks have been welded together by a superhigh-output electron beam to form a welded blank according to the invention.

In still another embodiment of this invention as illustrated in FIGS. 6 through 10, the joint surface 15 of a hollow cylindrical carbon-steel blank 11 is suitably machine finished so that it can be welded with a superhigh-output electron beam. Next, a core metal 16 of stainless steel is fitted into the carbon-steel blank 11, and the combined structure is placed in a superhigh-output electron-beam apparatus. Then, as in the preceding embodiment of the invention and as indicated in FIG. 7, the welding electron beam is projected along the joint interface 15 in the axial direction from one end or both ends (from both ends in the illustrated example) as the electron beam is caused to travel one full circle around the interface 15. Thus the carbon-steel cylindrical blank 11 and the core metal 16 are welded together at weld metal parts 18a and 18b into an integral cylindrical blank 19.

Figure 8:
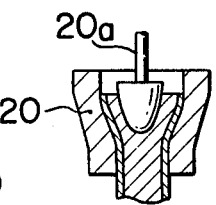
FIGS. 8, 9, and 10 are schematic side views respectively showing stages in the process of forming a clad steel pipe from the welded blank indicated in FIG. 7.
Figure 9:
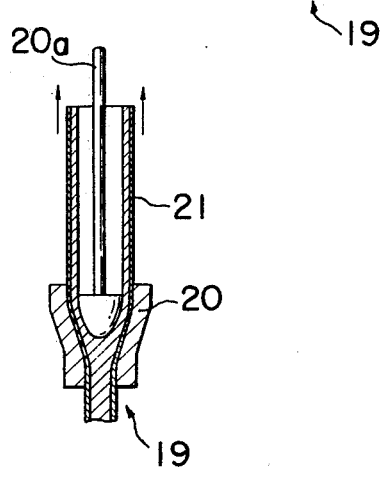
Figure 10:
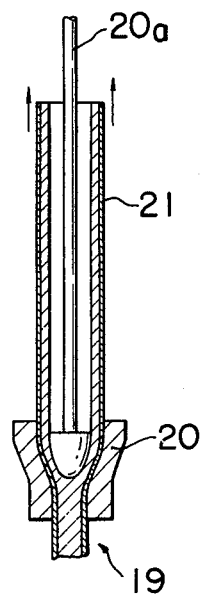

This cylindrial blank 19 is then taken out from the electron-beam apparatus and, in a forming apparatus having a die 20 and a mandrel 20a, is subjected to a piercing extrusion drawing operation as indicated in FIGS. 8, 9, and 10, whereupon a clad steel double-wall pipe 21 is produced.

The above described embodiment of the invention is not limited to the production of double-walled pipes but can be applied also to the production of multiple-wall pipes and tubes of three or more wall layers.

In a further embodiment of this invention as illustrated in FIGS. 11 through 14, the method of the invention is applied to forming clad steel shapes. Heretofore, the production of clad steel shapes has been on a relatively small scale but is expected to grow in the future.

A core metal 22 of carbon steel having a square cross section with rounded corners as shown in FIG. 11 is fitted into a stainless-steel blank 23 after their joint surfaces at 24 have been machine finished. Then, similarly as in the preceding embodiments of the invention, the two metal blanks are joined by welding with a superhigh-output electron beam to form welds at 25a and 25b penetrating throughout the interface between the two metal blanks thereby to obtain a combined blank 26.

This blank 26 is then formed in a forging apparatus into an H-shaped preparatory ingot 27 as shown in FIG. 13. This ingot 27 is then subjected to ordinary hot rolling in a known apparatus for rolling and forming H-shape steel and thus formed into a clad H-shape steel 30 as shown in FIG. 14.

Since the stainless-steel clad metal 23 and the core metal 22 have been strongly welded by the weld metal 25a and 25b formed by the electron beam, cladding is accomplished with no breakage whatsoever of the weld joint during the hot rolling process, and there is no infiltration of air into the joint.

The practical applications of this invention are not limited, of course, to the cladding of steel plates, double-wall pipes, multiple-wall pipes, and steel shapes as illustrated above but can be extended to various other modes of cladding such as that of metal bars and ingots. Furthermore, as briefly mentioned hereinbefore, cold rolling is also possible in the rolling process during or before which it is also possible to interpose a forging process step.

The thickness of the clad material in its blank state can be selected at a considerably small value, depending on the design, provided that it is sufficient for the welding with a superhigh-output electron beam. Accordingly, it is possible to lower production cost while, at the same time, the condition for corrosion resistance is satisfied.

Furthermore, this invention is not restricted to the cladding of inner and/or outer faces of carbon-steel articles with stainless steel. Various modes of superimposition in laminated state of two or more mutually different metal materials by lining, insertion, etc., are also within the purview of this invention. These modes of practice can be selected for various purposes such as increasing the strength, heat resistance, corrosion resistance, and wear resistance. With consideration of the purpose of use, the materials and combinations thereof can be selected from a great variety of substances, examples of which are steels such as ordinary steels, high-strength steels, dead-soft steels, stainless steels, high-speed steels, and wear-resistant steels and even nonferrous metals which can be welded by superhigh-output electron-beam welding such as, for example, Ti, Nb, Mo, Zr, Al, Cr, and Cu.

By the practice of this invention as described above, basically, a metal of different kind can be joined securely to a base steel material or some other metal material completely over their entire area of contact, whereby a positive welding of the metal blanks can be accomplished by only the process step of superhigh-output electron-beam welding.

Furthermore, since this superhigh-output electron-beam welding results in melting metallurgical bond over the entire joint area, the near-perfect finishing of the joining surfaces, the maintenance of a vacuum, and the maintenance of clean conditions and high temperature, which are required by the conventional joining processes, become unnecessary. For this reason, simplification of the process steps, improvement of the work efficiency, increase of the yield, reduction of costs, and improvement of accuracy are afforded.

The use of a superhigh-output electron beam in the practice of this invention is additionally advantageous in that it can produce a deep and narrow weld, which makes possible the use of a thin clad metal in the blank metal stage. As a resultant effect, with minimum thickness of the clad metal of the rolled product, ample heat resistance, corrosion resistance, and wear resistance are imparted. This means that there is not only a saving with respect to material cost but also with regard to labor in the forging or rolling step and power.

Still another advantageous feature of this invention is that the use of a superhigh-output electron beam affords deep welds which are considerably stronger than those made by other methods and which require markedly less heat energy per unit welding area. This advantage in turn affords a broader range of metals and combinations thereof for carrying out the invention. For example, in addition to stainless steel, other metals such as Ti, Nb, Al, Mo, and Zr as mentioned hereinbefore can be used.

The above mentioned high weld strength afforded by this invention makes possible either hot rolling or cold rolling of the joined metal blanks without any particular limit to the reduction ratio.

Furthermore, the welding speed of the welding by a superhigh-output electron beam is high, and the heat energy consumption is low, whereby the precision in fabricating products is high, which contributes greatly to the forming of very thin layers of clag metals.

A further feature of the method of this invention is that it does not require a separation plate or some other sealing material, which is often required by the conventional electron-beam welding method, as described hereinbefore. Accordingly, the assembly and handling work is simplified and facilitated.

What I claim is:

1. A method for producing clad steel materials which comprises placing against a steel material a metal material of a different composition in laminated state with mutual contact along a joint interface having two opposite edges, carrying out electron-beam welding along and throughout said joint interface by means of a superhigh-output electron beam whereby the electron beam is projected from each of said two edges toward the other edge, so as to fully reach an intermediate line between the two edges, to thereby obtain a metallurgical welded joint along the entire interface, and plastically extending metal materials thus joined.

2. A method according to claim 1 in which the steel material initially has the shape of a rectangular parallelopiped, and the metal material of a different composition comprises a plate fully covering a surface of the parallelopiped, and in which the electron-beam welding is carried out from opposite sides of the parallelopiped, the parallelopiped and the plate, after welding, being extended in directions parallel to the plate thereby to produce a laminated plate comprising the carbon steel in plate form covered by a layer of the metal material of the different composition.

3. A method according to claim 1 in which the steel material is initially a tube to become an outer tube, and the metal material of a different composition is initially a metal tube fitted within the outer tube, the electron-beam welding being carried out from both ends of the tubes, which are thereafter extended by rolling in the axial direction thereby to produce a double-wall tube.

4. A method according to claim 1 in which the steel material is initially a tube to become an outer tube, and the metal material of a different composition is initially a metal solid cylinder fitted within the outer tube, the electron-beam welding being carried out from both ends of the tubes thereby to form a solid cylindrical blank, which is thereafter formed into a clad-steel, double-wall tube by a piercing-extrusion-drawing operation.

5. A method according to claim 1 in which the steel material is initially a core metal having a substantially square cross section with rounded corners and the core metal is fitted into a frame blank having open ends, the core metal and the frame blank forming therebetween a contact interface, and in which the electron-beam welding is carried out from the sides of the open ends of the frame blank, thereby to obtain an integral combined blank, which is then worked by known steps into a clad steel shape.

6. A method according to claim 1, comprising the steps of: projecting the electron beam from one edge toward the other, as means for projecting the beam is moved along the one edge.

7. A method according to claim 6, comprising the steps of: concurrently projecting the electron beam from each edge.

8. A method according to claim 6, comprising the steps of: projecting the electron beam from one of the edges and then from the other.

* * * * *